(12) United States Patent
Abraham et al.

(10) Patent No.: US 8,970,825 B2
(45) Date of Patent: Mar. 3, 2015

(54) MANUAL DISTANCE MEASURING APPARATUS

(71) Applicant: Robert Bosch GmbH, Stuttgart (DE)

(72) Inventors: Steffen Abraham, Hildesheim (DE); Matthias Roland, Sunnyvale, CA (US); Andreas Pfeil, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/708,978

(22) Filed: Dec. 8, 2012

(65) Prior Publication Data

US 2013/0148098 A1 Jun. 13, 2013

(30) Foreign Application Priority Data

Dec. 13, 2011 (DE) .......................... 10 2011 088 367
Aug. 22, 2012 (DE) .......................... 10 2012 214 880

(51) Int. Cl.
*G01C 3/08* (2006.01)
*G01S 17/02* (2006.01)
(52) U.S. Cl.
CPC ................. *G01C 3/08* (2013.01); *G01S 17/023* (2013.01)
USPC .............. 356/4.01; 356/5.04; 356/22; 356/16
(58) Field of Classification Search
USPC .............. 356/4.01, 4.03, 4.04, 5.05, 5.01, 5.1
See application file for complete search history.

(56) References Cited

U.S. PATENT DOCUMENTS

| 5,699,149 A * | 12/1997 | Kuroda et al. ................ 356/4.01 |
| 7,796,782 B1 * | 9/2010 | Motamedi et al. ............ 382/106 |
| 2009/0251565 A1 * | 10/2009 | Molgaard ................... 348/231.2 |
| 2010/0026982 A1 * | 2/2010 | Kludas et al. ................. 356/4.01 |
| 2010/0114416 A1 * | 5/2010 | Au et al. .......................... 701/23 |
| 2010/0296077 A1 * | 11/2010 | Scott et al. .................... 356/4.01 |
| 2010/0328644 A1 * | 12/2010 | Lu et al. ........................ 356/5.01 |
| 2011/0102763 A1 * | 5/2011 | Brown et al. ................. 356/4.01 |
| 2011/0123135 A1 * | 5/2011 | Hsieh et al. .................... 382/285 |
| 2011/0128525 A1 * | 6/2011 | Mizuno et al. ................ 356/4.01 |
| 2011/0158475 A1 * | 6/2011 | Otani et al. .................... 382/103 |
| 2012/0200703 A1 * | 8/2012 | Nadir et al. ................... 348/144 |

FOREIGN PATENT DOCUMENTS

EP 0 686 857 A2 12/1995
WO 2010/148526 A1 12/2010

* cited by examiner

*Primary Examiner* — Luke Ratcliffe
*Assistant Examiner* — Assres H Woldemaryam
(74) *Attorney, Agent, or Firm* — Maginot, Moore & Beck LLP

(57) ABSTRACT

A manual distance measuring apparatus includes at least one computing unit, an image acquisition means and a laser measuring device, which determines a distance of a measurement point on a measurement object in a measurement direction during a measuring process. The computing unit is configured to control, at least by open-loop control, the measurement direction depending at least on an output characteristic variable of the image acquisition means.

6 Claims, 1 Drawing Sheet

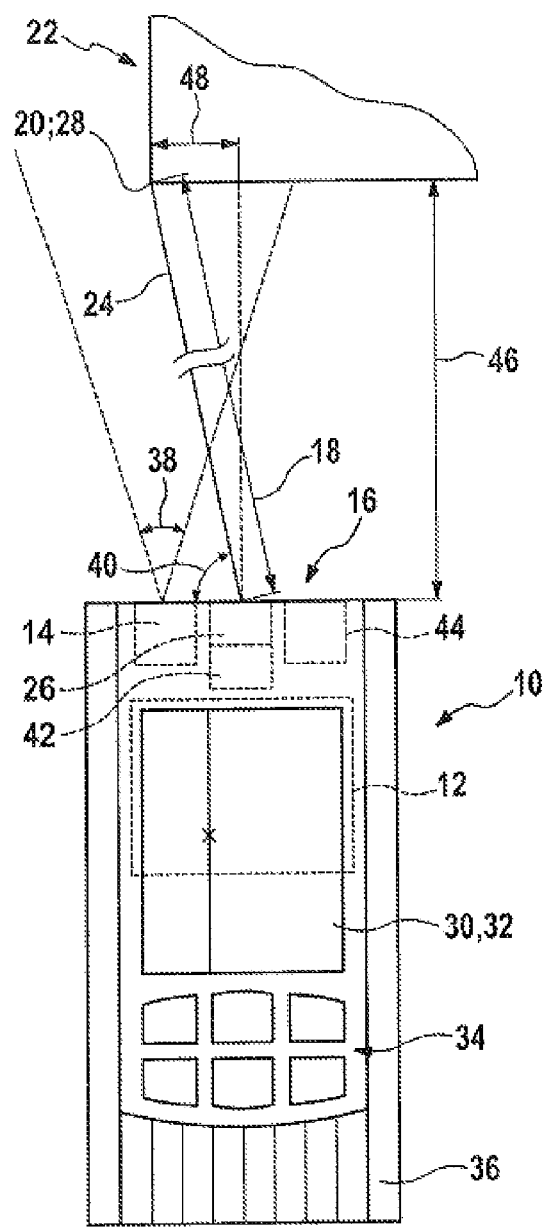

MANUAL DISTANCE MEASURING APPARATUS

This application claims priority under 35 U.S.C. §119 to both (i) patent application no. DE 10 2011 088 367.3, filed on Dec. 13, 2011 in Germany, and (ii) patent application no. DE 10 2012 214 880.9, filed on Aug. 22, 2012 in Germany. The disclosures of the above-identified patent applications are both incorporated herein by reference in their entirety.

BACKGROUND

A manual distance measuring apparatus comprising at least one computing unit, an image acquisition means and a laser measuring device, which determines a distance of a measurement point on a measurement object in a measurement direction during a measuring process has already been proposed.

SUMMARY

The disclosure is based on a manual distance measuring apparatus comprising at least one computing unit, an image acquisition means and a laser measuring device, which determines a distance of a measurement point on a measurement object in a measurement direction during a measuring process.

It is proposed that the computing unit is provided to control at least by open-loop control the measurement direction depending at least on an output characteristic variable of the image acquisition means. A "computing unit" should be understood to mean, in particular, a unit having an information input, an information processing system and an information output.

Advantageously, the computing unit has at least one processor, a memory, input and output means, an operating program, closed-loop control routines, open-loop control routines and/or calculation routines. Preferably, the components of the computing unit are arranged on a common circuit board and/or advantageously arranged in a common housing. In particular, an "image acquisition means" should be understood to be a means which acquires an at least two-dimensional image of at least one part of the measurement object. Preferably, the image acquisition means acquires the image of the measurement object in a visible light range. Preferably, the image acquisition means has a CCD sensor and/or a CMOS sensor. Preferably, the image acquisition means has an image repetition rate of between 10 and 100 Hz. Preferably, the computing unit stores, during each measuring process, alongside a measured distance in the measurement direction, at least one image recorded by the image acquisition means and advantageously a measurement direction relative to an apparatus housing of the manual distance measuring apparatus. A "laser measuring device" should be understood to mean, in particular, a device which emits at least one laser beam in the measurement direction and receives laser beam light reflected from the measurement object. Preferably, the laser measuring device emits a visible laser beam. Advantageously, the laser measuring device has a laser and an, in particular one-directional, optical sensor. Preferably, the optical sensor receives a part of the laser beam that is reflected from the measurement object. Preferably, the optical sensor continuously acquires the reflected part of the laser beam. Preferably, the manual distance measuring apparatus has an analog-to-digital converter that quantizes a signal output by the optical sensor, preferably after a frequency shift and/or, in particular, a demodulation. The analog-to-digital converter advantageously has a sampling rate that is higher than an image repetition rate of the image acquisition means. In particular, the analog-to-digital converter has a sampling rate of greater than 100 kHz, preferably greater than 1 MHz, particularly preferably greater than 10 MHz. In particular, a "measurement point" should be understood to mean a point on a surface of the measurement object which reflects the laser beam. A "measurement direction" should be understood to mean, in particular, a direction relative to the laser measuring device in which a distance between the laser measuring device and the measurement object is determined. The phrase "determine a distance", should be understood to mean, in particular, that the laser measuring device outputs a characteristic variable that is dependent on a distance between the measurement point and the laser measuring device. Advantageously, the laser measuring device generates the characteristic variable in a manner that seems expedient to the person skilled in the art. Particularly advantageously, the laser measuring device determines the characteristic variable from a propagation time of the laser beam. "Provided" should be understood to mean, in particular, specifically programmed, designed and/or equipped. In particular, an "output characteristic variable of the image acquisition means" should be understood to be a signal output by the image acquisition means. Preferably, the output characteristic variable has digitally coded information describing, in particular, an image. Preferably, the image acquisition means outputs the output characteristic variable via a wired data bus. Advantageously, the output characteristic variable transports at least one item of information about, in particular, two dimensions of the measurement object. The phrase "depending on an output characteristic variable" should be understood to mean, in particular, that the computing unit evaluates the output characteristic variable and sets the measurement direction depending on the evaluation. In particular, "to control at least by open-loop control" should be understood to mean that the computing unit controls by open-loop control and/or advantageously by closed-loop control. The configuration of the manual distance measuring apparatus according to the disclosure enables the measurement direction to be altered advantageously rapidly and particularly accurately, wherein recourse can be had to an output characteristic variable of the image acquisition means. In particular, a measurement direction can be supervised and documented by means of the image acquisition means. Furthermore, measurements can be particularly advantageously reproduced.

In a further configuration, it is proposed that the laser measuring device has at least one measurement direction setting unit which alters the measurement direction in at least one operating state, as a result of which an automatic orientation of the measurement direction is advantageously possible. A "measurement direction setting unit" should be understood to mean, in particular, a unit having at least one actuator which influences a direction in which the laser measuring device emits the laser beam relative to the apparatus housing of the manual distance measuring apparatus. Preferably, the measurement direction setting unit is provided to alter the measurement direction by a maximum measurement angle that is less than 45 degrees, preferably less than 20 degrees, particularly preferably less than 10 degrees. Preferably, the measurement direction setting unit has at least one actuator which seems expedient to the person skilled in the art but, preferably an electromechanical actuator and/or a micromechanical actuator. Advantageously, the actuator moves the laser, an optical unit of the laser measuring device, in particular a micromirror, the optical sensor and/or an optical unit of the optical sensor. In particular, the actuator moves the laser, in particular the image acquisition means and the micromirror, advantageously relative to the apparatus housing. Preferably, the measurement direction setting unit is provided to pivot the measurement direction about an axis. Alternatively, a measurement direction setting unit could be provided to pivot the measurement direction setting unit about two axes, which are preferably oriented perpendicular to one another. In particular, an "apparatus housing" should be understood to mean a unit which mechanically links a plurality of assemblies arranged in an interior of the apparatus housing. Preferably, an operator grips the apparatus housing during a measuring process. The phrase "alter the measurement direction" should be understood to mean, in particular, that the measurement direction setting unit alters the direction, relative to the apparatus housing, in which the laser measuring device emits the laser beam.

Furthermore, it is proposed that the computing unit is provided to determine, from the output characteristic variable of the image acquisition means, at least one change in orientation relative to the measurement object, as a result of which a movement of the apparatus housing, caused for example by the operator trembling, can advantageously be compensated for. Furthermore, an incorrect measurement caused by the change in orientation can be diagnosed and/or documented. In particular, "determine a change in orientation" should be understood to mean that the computing unit registers at least one rotation at least of the image acquisition means and/or advantageously of the apparatus housing relative to the measurement object. Preferably, the computing unit is provided to determine a movement at least of the image acquisition means relative to the measurement object. Preferably, the computing unit determines the change in orientation by means of a comparison of two images recorded by the image acquisition means. Preferably, the computing unit has image-based feature detection, in particular by means of at least one interest operator that seems expedient to the person skilled in the art and/or by means of a method for determining a shift of the image features, such as a correlation method, for example.

Furthermore, it is proposed that the computing unit is provided to determine, from the output characteristic variable of the image acquisition means, a measurement direction in which a structural element of the measurement object is arranged, as a result of which an angle between a present measurement direction and the measurement direction with respect to the structural element can advantageously be determined. A "structural element" should be understood to mean, in particular, a region of the measurement object which can be distinguished from other regions of the measurement object by the image acquisition means. By way of example, the structural element could be embodied as a hole, as a groove, as an edge, as a corner, as a color change and/or as some other structural element that seems expedient to the person skilled in the art. Preferably, the operator applies the structural element to the measurement object with a colorant that is invisible in particular in the visible frequency range.

In addition it is proposed that the computing unit is provided to orient the measurement direction toward the structural element of the measurement object, as a result of which the operator can conveniently carry out a particularly accurate measurement of a distance with respect to the structural element. In particular, the phrase "orient [ . . . ] toward the structural element of a measurement object" should be understood to mean that the computing unit orients the measurement direction of the laser measuring device toward a point of the structural element. Preferably, the computing unit orients the measurement direction toward a distinctive point, for example toward a corner, toward a midpoint and/or toward an operator-selectable point of the structural element.

Furthermore, it is proposed that the computing unit is provided to keep the measurement direction directed at the structural element of the measurement object in the event of an apparatus movement, as a result of which it is possible to compensate for the operator trembling, for example. Preferably, the computing unit keeps the measurement direction directed at the structural element of the measurement object, at least until the operator initiates a measurement, until the structural element leaves a viewing angle of the image acquisition means and/or until the operator terminates the process by an operator input. An "apparatus movement" should be understood to mean a movement of the manual distance measuring apparatus relative to the measurement object. In particular, the phrase "keep [ . . . ] directed at the structural element" should be understood to mean that the computing unit orients the measurement direction toward an identical point of the structural element while the operator moves the manual distance measuring apparatus.

In one advantageous embodiment of the disclosure it is proposed that the computing unit is provided to determine the measurement direction from the output characteristic variable of the image acquisition means, as a result of which further sensors can be dispensed with in a structurally simple manner. The phrase "determine [ . . . ] from the output characteristic variable" should be understood to mean, in particular, that the computing unit digitally analyzes the images recorded by the image acquisition means and determines the measurement direction from the images. In particular, the image acquisition means registers a reflection of the laser beam at the measurement object. Preferably, the computing unit calculates an angle at which light reflected at the measurement point impinges on the image acquisition means. Advantageously, the computing unit determines the present measurement direction of the laser measuring device from the angle and a distance determined by the laser measuring device. Particularly advantageously, the computing unit controls the measurement direction by closed-loop control such that the measurement direction is directed at the structural element. Alternatively, the computing unit could determine the measurement direction in some other way that seems expedient to the person skilled in the art. In one advantageous configuration, the computing unit outputs a measurement direction controlled variable on the basis of which the laser measuring device sets the measurement direction.

Furthermore, it is proposed that the manual distance measuring apparatus comprises a display unit, which represents at least the output characteristic variable of the image acquisition means to an operator in at least one operating state, as a result of which the operator can particularly advantageously determine and check a measurement direction. A "display unit" should be understood to mean, in particular, a display that seems expedient to the person skilled in the art, but advantageously an LCD display and/or particularly advantageously an OLED display. Preferably, the display unit is provided to represent at least one image, preferably in color. In particular, the phrase "represent the output characteristic variable of the image acquisition means" should be understood to mean that the display unit in one operator state represents the image previously recorded by the image acquisition means, in particular live.

Furthermore, it is proposed that the manual distance measuring apparatus comprises an input unit via which a structural element of the measurement object is selectable by an operator in at least one operating state, as a result of which the operator, in a structurally simple manner, can select a structural element that said operator wants to measure. In particular, an "input unit" should be understood to mean a unit which is provided to take up an operator input. Preferably, the input unit provides a characteristic variable which is dependent on the operator input and which is particularly preferably evaluated by the computing unit. Preferably, the input unit has an input means that seems expedient to the person skilled in the art, but particularly advantageously a touch-sensitive display covering (Touchscreen). The phrase "selectable by an operator" should be understood to mean, in particular, that the computing unit is provided to assign a structural element of the measurement object to at least one operator input. Preferably, the computing unit orients the measurement direction toward the structural element selected by the operator input after the operator input.

BRIEF DESCRIPTION OF THE DRAWING

Further advantages will become apparent from the following description of the drawing. The drawing illustrates an exemplary embodiment of the disclosure. The drawing, the description and the claims contain numerous features in combination. The person skilled in the art will expediently also consider the features individually and combine them to form expedient further combinations.

DETAILED DESCRIPTION

The FIGURE shows a manual distance measuring apparatus 10 comprising a computing unit 12, an image acquisition means 14, a laser measuring device 16, a display unit 30, a first input unit 32, a second input unit 34 and an apparatus housing 36. The apparatus housing 36 encloses an interior in which the computing unit 12, the image acquisition means 14, the laser measuring device 16 and the display unit 30 are at least partly arranged. The apparatus housing 36 fixes at least the computing unit 12, the image acquisition means 14, the laser measuring device 16 and the display unit 30 at least partly relative to one another. During a measuring process, the operator grips the apparatus housing 36 and orients a side of the apparatus housing 36 on which the laser measuring device 16 is arranged toward a measurement object 22.

The computing unit 12 is embodied as a digital signal processor. Alternatively, a computing unit could be embodied as some other microprocessor that seems expedient to the person skilled in the art. The image acquisition means 14 has, in a manner not illustrated in greater detail here, an optical unit and an image sensor. The image sensor is embodied as a CCD sensor. The optical unit is embodied as a telephoto lens. Preferably, the image acquisition means 14 has a maximum viewing angle 38 which is, in particular, slightly greater than a maximum measuring angle 40 of the laser measuring device 16. During operation, the image acquisition means 14 outputs an electrical output characteristic variable which transmits an image recorded by the image acquisition means 14 to the computing unit 12.

The laser measuring device 16 has a measurement direction setting unit 26, a laser 42 and an optical sensor 44. The laser 42 emits a modulated laser beam that seems expedient to the person skilled in the art in a measurement direction 24. The measurement object 22 reflects, at a measurement point 20, a part of a light of the laser beam in the direction of the optical sensor 44. Furthermore, the measurement object 22 reflects a part of the light of the laser beam in the direction of the image acquisition means 14. The optical sensor 44 receives the reflected part of a light of the laser beam and converts it into an electrical output characteristic variable of the optical sensor 44. An analog-to-digital converter (not illustrated in greater detail here) of the manual distance measuring apparatus 10 digitizes the output characteristic variable of the optical sensor 44. During a measuring process, the computing unit 12 determines a distance 18 of the measurement point 20 from the apparatus housing 36 in the measurement direction 24.

The measurement direction setting unit 26 comprises a micromirror (not illustrated in greater detail here) provided to alter the measurement direction 24. For this purpose, the micromirror is arranged in a beam path of the laser beam. The micromirror is driven piezoelectrically. The measurement direction setting unit 26 is provided to pivot the measurement direction 24 about two axes. During operation, the computing unit 12 controls by open-loop control the measurement direction setting unit 26 depending on an output characteristic variable of the image acquisition means 14. For this purpose, the computing unit 12 determines, from the output characteristic variable of the image acquisition means 14, a measurement direction 24 in which a structural element 28 of the measurement object 22 is arranged. The computing unit 12 determines structural elements 28 present in the image by means of an image correlation, and/or other computation methods that seem expedient to the person skilled in the art. Subsequently, the computing unit 12 directs the laser beam and thus the measurement direction 24 by means of the measurement direction setting unit 26 at one of the structural elements 28 of the measurement object 22. The structural element 28 illustrated is embodied as an edge. Furthermore, the computing unit 12 determines, by means of a trigonometric function, a distance 46 perpendicular to that side of the apparatus housing 36 on which the laser measuring device 16 is arranged, and at least one distance 48 parallel to the side of the apparatus housing 36. Preferably, the computing unit 12 determines a horizontal and a vertical component of the distance 48 relative to the apparatus housing 36 and/or relative to gravity.

Furthermore, the computing unit 12 is provided to determine, from the output characteristic variable of the image acquisition means 14, at least one change in orientation relative to the measurement object 22. For this purpose, the computing unit 12 has an orientation change recognition function that tracks features and structural elements 28 via a plurality of images of the image acquisition means 14. The orientation change recognition function comprises a method for image processing for tracking distinctive features, here the structural elements 28, by means of interest operator and correlation methods. The computing unit 12 compensates for the change in orientation and keeps the measurement direction 24 directed at the structural element 28 of the measurement object 22 in the event of an apparatus movement. Moreover, the computing unit 12 determines the measurement direction 24 from the output characteristic variable of the image acquisition means 14 in one operating mode. For this purpose, the computing unit 12 identifies, in an image recorded by the image acquisition means 14, the measurement point 20 at which the measurement object 22 reflects a part of the laser beam. The computing unit 12 controls the measurement direction 24 by closed-loop control by means of the measurement direction setting unit 26.

During one operating mode, the display unit 30 represents the output characteristic variable of the image acquisition means 14 as an image to an operator. In this case, the computing unit 12 marks the identified structural elements 28. The first input unit 32 is embodied as a touchscreen. The second input unit 34 has a plurality of keys. Via the input units 32, 34, the operator selects, in one operating state, a structural element 28 of the measurement object 22 that has been identified by the computing unit 12. The computing unit 12 subsequently orients the measurement direction 24 toward said structural element 28. If the operator does not select any structural element 28, the computing unit 12 selects an identified structural element 28 of the measurement object 22 which is arranged in a vicinity of the measurement point 20.

What is claimed is:

1. A manual distance measuring apparatus comprising:
   a portable housing configured to be gripped by a user during use;
   an image acquisition means positioned within the housing and configured to record images of a measurement object and generate output characteristic variables representative of the recorded images;
   a laser measuring device positioned within the housing and configured to determine a distance of a measurement point on the measurement object in a measurement direction during a measuring process; and
   at least one computing unit positioned within the housing and configured to control, at least by open-loop control, the measurement direction depending at least on the output characteristic variables of the image acquisition means,
   wherein the at least one computing unit is configured to identify at least one structural element of the measurement object from the output characteristic variables of a plurality of different images and to compare the plurality of images to detect changes in orientation of the at least one structural element resulting from movement of the housing, and
   wherein the at least one computing unit is configured to adjust the measurement direction in response to detecting a change in orientation of the structural element resulting from movement of the housing from the comparison of the plurality of images to maintain the measurement direction directed at the measurement point.

2. The manual distance measuring apparatus according to claim 1, wherein the laser measuring device includes at least one measurement direction setting unit configured to alter the measurement direction in at least one operating state.

3. The manual distance measuring apparatus according to claim 1, wherein the computing unit is configured to determine, from the output characteristic variables of the image acquisition means, at least one change in orientation of the measurement object relative to the measuring apparatus.

4. The manual distance measuring apparatus according to claim 1, further comprising:
   a display unit on the housing configured to represent at least the output characteristic variable of the image acquisition means to an operator in at least one operating state.

5. The manual distance measuring apparatus according to claim 1, further comprising:
   an input unit on the housing, via which a structural element of the measurement object is selectable by an operator in at least one operating state.

6. A method of operating a manual distance measuring apparatus having a housing and at least one computing unit, an image acquisition means, and a laser measuring device supported within the housing, comprising:
   manually orienting the housing so the image acquisition means and the laser measuring device are pointed toward a measurement object;
   generating output characteristic variables representative of images of the measurement object with the image acquisition device;
   detecting changes in orientation of the measurement object caused by movement of the housing of the manual distance measuring apparatus from the output characteristic variables using the at least one computing unit;
   moving the laser measuring device in order to adjust the measurement direction depending on the output characteristic variables of the image acquisition means through open-loop control to maintain the measurement direction directed at the measurement point; and
   determining a distance of a measurement point on the measurement object in a measurement direction during a measuring process with the laser measuring device.

* * * * *